United States Patent
Furuno et al.

(10) Patent No.: US 11,292,303 B2
(45) Date of Patent: Apr. 5, 2022

(54) CONNECTING DEVICE AND TOWING VEHICLE

(71) Applicant: HONDA MOTOR CO., LTD., Tokyo (JP)

(72) Inventors: Takuya Furuno, Tochigi (JP); Yoshito Otake, Tochigi (JP); Sumio Noguchi, Tochigi (JP); Yasushi Watanabe, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 499 days.

(21) Appl. No.: 16/257,161

(22) Filed: Jan. 25, 2019

(65) Prior Publication Data
US 2019/0232738 A1 Aug. 1, 2019

(30) Foreign Application Priority Data

Jan. 31, 2018 (JP) .............................. JP2018-015168

(51) Int. Cl.
*B60D 1/04* (2006.01)
*B60D 1/36* (2006.01)
(Continued)

(52) U.S. Cl.
CPC ................. *B60D 1/04* (2013.01); *B60D 1/02* (2013.01); *B60D 1/36* (2013.01); *B60D 1/62* (2013.01);
(Continued)

(58) Field of Classification Search
CPC . B60D 1/04; B60D 1/02; B60D 1/025; B60D 1/36; B60D 1/246
See application file for complete search history.

(56) References Cited

U.S. PATENT DOCUMENTS 2,444,575 A * 7/1948 McElhinney ............ B60D 1/04
280/504
2,478,736 A * 8/1949 Balzen ................... B60D 1/025
280/477
(Continued)

FOREIGN PATENT DOCUMENTS

| JP | S05-006142 Y | 5/1930 |
| JP | H10-58929 A | 3/1998 |
| JP | 10-309915 | 11/1998 |

OTHER PUBLICATIONS

Japanese Office Action dated Jul. 16, 2019, 4 pages.

*Primary Examiner* — Minnah L Seoh
*Assistant Examiner* — Michael R Stabley
(74) *Attorney, Agent, or Firm* — Rankin, Hill & Clark LLP

(57) ABSTRACT

A connecting device 1 of a towing vehicle 2 includes a connecting pin 13, a locking arm 22, and an actuator 23. The connecting pin 13 is provided to be rotatable between a connection position where the connecting pin 13 is brought into fitting engagement with a connecting plate 3a of a wheeled platform 3 and a disconnection position where the connecting pin 13 is taken out of the fitting engagement with the connecting plate 3a. The locking arm 22 is driven by the actuator 23 between a locking position where locking arm 22 is locked with the connecting pin 13 such that the connecting pin 13 cannot rotate out of the connection position toward the disconnection position and an unlocking position where the connecting pin 13 is unlocked in the connection position.

19 Claims, 12 Drawing Sheets

(51) Int. Cl.
*B60D 1/02* (2006.01)
*B60D 1/24* (2006.01)
*B60D 1/62* (2006.01)
B60D 1/48 (2006.01)
B60D 1/00 (2006.01)

(52) U.S. Cl.
CPC ............... *B60D 1/246* (2013.01); *B60D 1/48* (2013.01); *B60D 2001/005* (2013.01)

(56) References Cited

U.S. PATENT DOCUMENTS

| | | | | |
|---|---|---|---|---|
| 2,556,748 A * | 6/1951 | Buckley | ................ | B60D 1/025 |
| | | | | 280/477 |
| 2,671,673 A * | 3/1954 | Benson | ................ | B60D 1/26 |
| | | | | 280/477 |
| 3,744,819 A * | 7/1973 | Cook | ................ | B60D 1/02 |
| | | | | 280/477 |
| 4,073,507 A * | 2/1978 | Dingess | ................ | B60D 1/02 |
| | | | | 280/477 |
| 4,225,149 A * | 9/1980 | Koopman | ................ | B60D 1/26 |
| | | | | 280/477 |
| 4,484,760 A * | 11/1984 | Rach | ................ | B60D 1/02 |
| | | | | 280/477 |
| 4,998,745 A * | 3/1991 | David | ................ | B60D 1/02 |
| | | | | 280/508 |
| 5,769,559 A * | 6/1998 | Olson | ................ | B60D 1/02 |
| | | | | 280/509 |
| 6,047,982 A * | 4/2000 | McClure | ................ | A01B 59/042 |
| | | | | 280/504 |
| 6,981,716 B2 * | 1/2006 | Takeda | ................ | B60D 1/02 |
| | | | | 280/504 |
| 9,469,514 B1 * | 10/2016 | Hendricks | ................ | B66F 9/07504 |
| 2006/0244240 A1 * | 11/2006 | Nelson | ................ | B60D 1/02 |
| | | | | 280/512 |
| 2019/0054782 A1 * | 2/2019 | Lasater | ................ | B60D 1/025 |

\* cited by examiner

CONNECTING DEVICE AND TOWING VEHICLE

BACKGROUND OF THE INVENTION

Field of the Invention

The present invention relates to a connecting device and the like which connect and disconnect two connectable elements.

Description of the Related Art

A conventional known connecting device is described, for example, in Japanese Patent Application Laid-Open No. H10-309915. The conventional connecting device, which is provided at a rear end section of a manned towing vehicle of a towing tractor type, is configured to connect the manned towing vehicle and a wheeled platform to each other and disconnect them from each other.

The connecting device is composed of upper and lower plates, a rotating shaft, a connecting pin, an operation lever, and other components. The upper and lower plates are arranged in parallel with and horizontally to each other and a long hole is formed at the center of each of them. The long holes extend through the upper and lower plates, respectively, in an upward-downward direction. Also, the rotating shaft is rotatably attached to the upper surface of the upper plate so as to be rotatable about a horizontal axis line. The connecting pin extends from the rotating shaft in such a manner that is orthogonal to the central axis line of the rotating shaft. The connecting pin is normally placed by its own weight in an attitude in which it extends along the upward-downward direction and, in this state, the upper end section and the lower end section of the connecting pin are positioned in the long holes of the upper and lower plates, respectively.

Also, the operation lever is formed in one piece with the rotating shaft. The central axes of the connecting pin and the operation lever are positioned on a plane orthogonal to the axis line of the rotating shaft, and they are arranged such that the angle defined between them becomes an obtuse angle. Meanwhile, a U-shaped hook is provided at the front end section of the wheeled platform.

According to this connecting device, when the towing vehicle and the wheeled platform are to be connected to each other, the towing vehicle is moved toward the wheeled platform, and the connecting pin is brought into abutment on the hook of the wheeled platform and pressed by the hook. In response to this, the connecting pin rotates and moves upward about the rotating shaft. At the timing at which the tip of the hook has passed the lower end of the connecting pin, the connecting pin rotates and moves downward by its own weight, and moves into the hook and the long hole of the lower plate. As a result, the towing vehicle and the wheeled platform are connected to each other and a state is entered where the towing vehicle can tow the wheeled platform.

According to the above-described connecting device of Japanese Patent Application Laid-Open No. H10-309915, when the towing vehicle and the wheeled platform are disconnected from each other, the operation lever is operated downward after the towing vehicle is moved toward the wheeled platform, which causes the connecting pin to be rotated and moved until the lower end thereof reaches a position where the lower end is upper than the hook and, in this state, the towing vehicle needs to be moved such that it moves away from the wheeled platform. Specifically, the problem found in the connecting device of Japanese Patent Application Laid-Open No. H10-339915 is that, at the time of the disconnection, the towing vehicle needs to be moved closer to the wheeled platform and then moved away therefrom. In other words, back-and-forth movement of the towing vehicle is necessitated, which takes time and labor to the detriment of usability.

An object of the present invention, which has been made to solve the above-described problem, is to provide a connecting device that can readily disconnect two connectable elements from each other and improve usability and the like.

SUMMARY OF THE INVENTION

In order to achieve the above-described object, the present invention is directed to a connecting device 1 provided in one (towing vehicle 2) of two connectable elements (towing vehicle 2 and wheeled platform 3) and configured to connect the two connectable elements to each other and disconnect them from each other. The connecting device 1 includes a connecting member (connecting pin 13), a locking member (locking arm 22), and a driving element (actuator 23). The connecting member (connecting pin 13) is rotatable about a predetermined first axis line between a connection position (the position illustrated in FIG. 11) where the connecting member (connecting pin 13) is brought into engagement with a mating member of the other of the two connectable elements (wheeled platform 3) so as to connect the two connectable elements (towing vehicle 2 and wheeled platform 3) to each other and a disconnection position (the position illustrated in FIG. 12) where the connecting member (connecting pin 13) is disengaged from the mating member by movement of the mating member in response to relative movement of the two connectable elements (towing vehicle 2, wheeled platform 3) so as to disconnect the two connectable elements from each other. The locking member (locking arm 22) is movable between a locking position (the position illustrated in FIG. 4) where the locking member (locking arm 22) is brought into abutment on the connecting member (connecting pin 13) at the connection position and locks the connecting member (connecting pin 13) at the connection position such that the connecting member (connecting pin 13) is not rotatable out of the connection position toward the disconnection position and an unlocking position (position illustrated in FIG. 7) where the locking member (locking arm 22) is taken out of the abutment on the connecting member (connecting pin 13) so as to unlock the connecting member (connecting pin 13) at the connection position. The driving element (actuator 23) is capable of driving the locking member (locking arm 22) such that the locking member (locking arm 22) moves between the locking position and the unlocking position.

According to the connecting device, the connecting member is rotatable about the predetermined first axis line between the connection position where the connecting member is brought into engagement with the mating member of the other of the two connectable elements so as to connect the two connectable elements to each other and a disconnection position where the connecting member is disengaged from the mating member by relative movement of the mating member in response to relative movement of the two connectable elements so as to disconnect the two connectable elements from each other. Accordingly, when the connecting member is at the connection position, the connecting member is brought into engagement with the mating member of the other of the two connectable elements and thereby the two connectable elements are connected to each other. Also, the locking member is movable between the locking position where the locking member is brought into abutment on the connecting member at the connection position and locks the connecting member at the connection position such that the connecting member is not rotatable out of the connection position toward the disconnection position and the unlocking position where the locking member is taken out of the abutment on the connecting member so as to unlock the connecting member at the connection position. Accordingly, when the locking member is at the locking position in a state where the connecting member is at the connection position, the connecting member is locked at the connection position.

Further, the locking member can drive the locking member such that the locking member moves between the locking position and the unlocking position. Accordingly, in a state where the connecting member is at the connection position and the locking member is at the locking position, the two connectable elements are disconnected from each other when the connecting member rotated and moved from the connection position to the disconnection position by relative movement of the two connectable elements after the locking member has been driven by the driving element from the locking position to the unlocking position. In this manner, the two connectable elements can be readily disconnected from each other by only one round of relative movement and thereby usability can be improved (note that the "engagement" as used in the statement "the connecting member is brought into engagement with the mating member" throughout the specification may include a state where the connecting member and the mating member are in abutment on each other, a state where the connecting member and the mating member are brought into fitting engagement with each other, and a state where the connecting member and the mating member are placed in a loosely fitted condition).

In the present invention, it is preferable that a location of abutment of the connecting member (connecting pin 13) where the locking member (locking arm 22) is in abutment on the connecting member (connecting pin 13) in the connection position is arranged on an opposite side of a first plane on which the predetermined first axis line resides with respect to a location of engagement of the connecting member (connecting pin 13) where the mating member (connecting plate 3a) is brought into engagement with the connecting member (connecting pin 13).

According to the connecting device, the location of abutment of the connecting member where the locking member is in abutment on the connecting member when the connecting member is at the connection position resides on the opposite side of the first plane on which the predetermined first axis line resides with respect to the location of engagement of the connecting member where the mating member is brought into engagement with the connecting member. Accordingly, when the mating member relatively moves in response to the relative movement of the two connectable elements and the connecting member is rotated and moved out of the connection position to reach the disconnection position and thereby the engagement with the mating member is exited and the interconnection between the two connectable elements is exited, the locking member can be prevented from interfering with the disconnection operation and the disconnection operation can be smoothly performed.

In the present invention, it is preferable that the first plane is configured to be orthogonal to a first straight line extending in a direction in which the connecting member (connecting pin 13) extends.

According to the connecting device, the location of abutment of the connecting member is arranged on the opposite side of the first plane orthogonal to the straight line extending in the direction in which the connecting member extends with respect to the location of engagement of the connecting member. Accordingly, when the two connectable elements are disconnected from each other, the locking member can be reliably prevented from interfering with the disconnection operation and the disconnection operation can be smoothly and reliably performed.

In the present invention, it is preferable that the connecting member (connecting pin 13) is configured to be positioned at the connection position by its own weight when it is not in engagement with the mating member (connecting plate 3a).

According to the connecting device, the connecting member is configured to be positioned at the connection position by its own weight when it is not in engagement with the mating member. Accordingly, the connecting member rotates and moves by its own weight from the disconnection position to be restored to the connection position after rotating and moving from the connection position to the disconnection position and after the engagement with the mating member is exited. As a result, it is not necessary to provide a member for taking the connecting member out of the disconnection position and restore it to the connection position, and the manufacturing costs can be thereby reduced.

In the present invention, it is preferable that the connecting device further includes a fixed abutment member configured to be brought into abutment on the locking member (locking arm 22) from an opposite side of the connecting member (connecting pin 13) when the connecting member (connecting pin 13) is at the connection position and the locking member (locking arm 22) is at the locking position.

According to the connecting device, when the connecting member is at the connection position and the locking member is at the locking position, the fixed abutment member is brought into abutment on the locking member from the opposite side of the connecting member. Accordingly, when the load acts on the locking member from the connecting member, the load can be borne by the abutment member. By virtue of this, in comparison with the case where the load from the connecting member is only borne by the locking member, the strength and durability of the connecting device can be improved.

In the present invention, it is preferable that the locking member (locking arm 22) is configured to move between the locking position and the unlocking position by rotating about a predetermined second axis line along a second plane that is parallel to a second straight line extending in a direction in which the connecting member (connecting pin 13) in the connection position extends and parallel to the predetermined first axis line, the driving element is capable of driving a second portion of the locking member (locking arm 22) on an opposite side of a third plane parallel to the second straight line where the predetermined second axis line resides with respect to a first portion of the locking member (locking arm 22) in abutment on the connecting member (connecting pin 13) when the locking member (locking arm 22) is at the locking position.

According to the connecting device, when the locking member is driven by the driving element such that it moves between the locking position and the unlocking position, the locking member rotates about the predetermined second axis line along the second plane that is parallel to the second straight line extending in the direction in which the connecting member in the connection position extends and the predetermined first axis line. When the locking member rotates in this manner, the driving element is capable of driving the second portion of the locking member on the opposite side of the third plane parallel to the second straight line where the predetermined second axis line is positioned with respect to the first portion of the locking member in abutment on the connecting member when the locking member is at the locking position. Accordingly, it is made possible to drive, by the driving element, the second portion that is spaced away, in the direction in which the locking member extends, from the plane of rotation on which the connecting member rotates between the connection position and the disconnection position with the predetermined second axis in between. Accordingly, the driving element can be prevented from interfering with the rotational movement of the connecting member, and it is made possible to smoothly perform the disconnection operation by the connecting member (note that "to rotate along a plane" throughout the specification is not limited to rotating in parallel with a plane but includes rotating with an angle slightly inclined with respect to the plane).

In the present invention, it is preferable that the driving element is composed of a driving device (actuator 23) driving the locking member (locking arm 22) by supply of energy and being capable of driving locking member (locking arm 22) by a manual operation when the energy is not supplied.

According to the connecting device, the driving element is composed of the driving device that can drive the locking member by supply of energy and drive the locking member by the manual operation when the energy is not supplied. Accordingly, when the energy is supplied, the two connectable elements can be automatically disconnected from each other and, even when the energy is not supplied, the two connectable elements can be disconnected from each other by the manual operation of the driving device. As a result, the usability can be further improved.

In the present invention, a towing vehicle 2 which includes the above-described connecting device is preferable, where the towing vehicle 2 is the one connectable element.

According to the towing vehicle, by moving the towing vehicle by only one round, the connection to another connectable element can be readily exited and thereby it is made possible to achieve a towing vehicle with high usability.

DETAILED DESCRIPTION OF THE PREFERRED EMBODIMENTS

Figure 1:
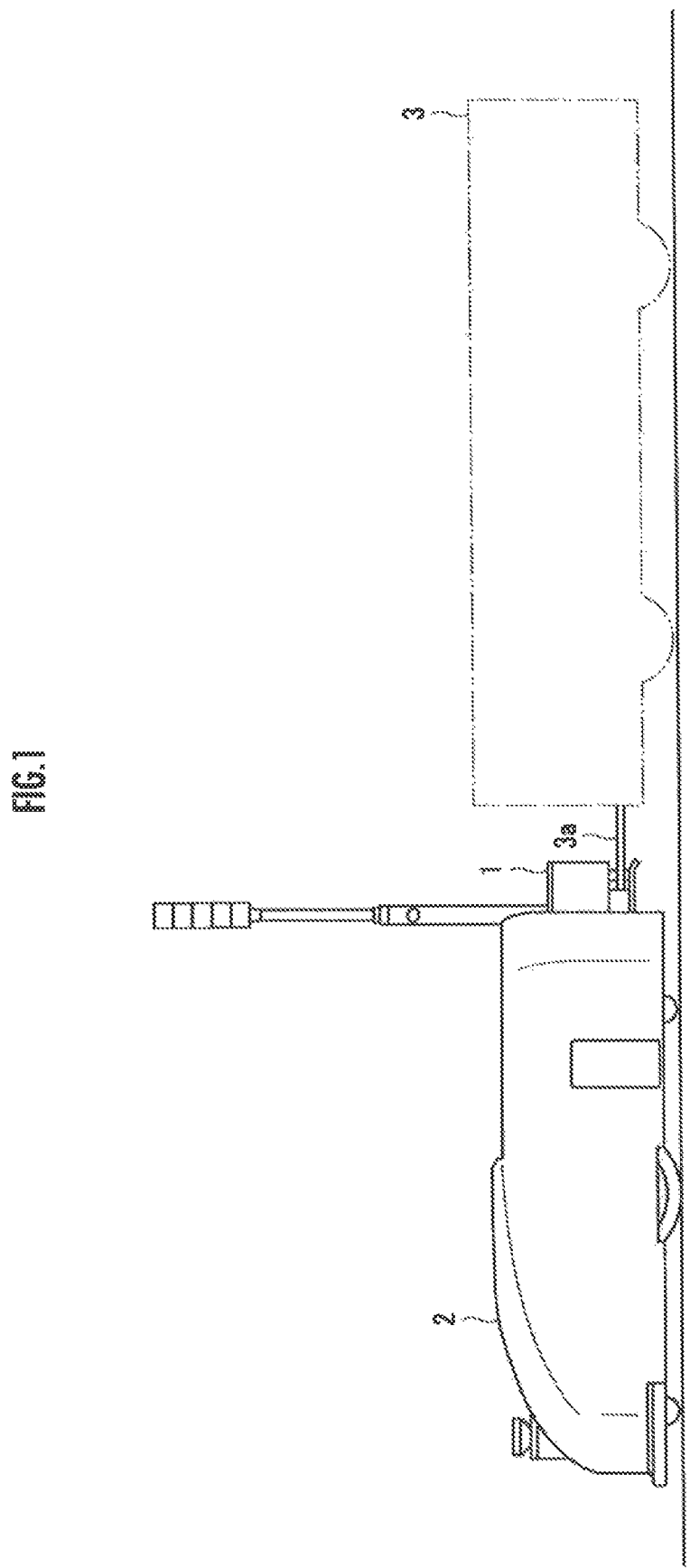
FIG. 1 is a diagram illustrating features of a connecting device and a towing vehicle incorporating it according to one embodiment of the present invention.

A connecting device in accordance with one embodiment of the present invention will be described hereinbelow with reference to the drawings. Referring to FIG. 1, the connecting device 1 according to this embodiment is configured to connect a towing vehicle 2 and a wheeled platform 3 to each other and disconnect them from each other. FIG. 1 depicts a state where the towing vehicle 2 and the wheeled platform 3 reside on a level floor surface.

It should be noted that, in the following description of the embodiment, and illustrations, the front side of the towing vehicle 2 in FIG. 1 (the left side in this figure) is referred to as "front," the rear side thereof as "rear, the left side (the proximal side in FIG. 1) as "left," and the right side as "right" for the sake of explanations. Also, the vertical direction and the horizontal direction in FIG. 1 are simply referred to as "vertical direction" and "horizontal direction," respectively.

The towing vehicle 2 is a towing vehicle of an unmanned type that incorporates an in-vehicle controller. An automatic running state of the towing vehicle 2 and operation of the connecting device 1 at the time of disconnection are controlled by command signals input to the in-vehicle controller from a not-shown main controller.

Figure 5:
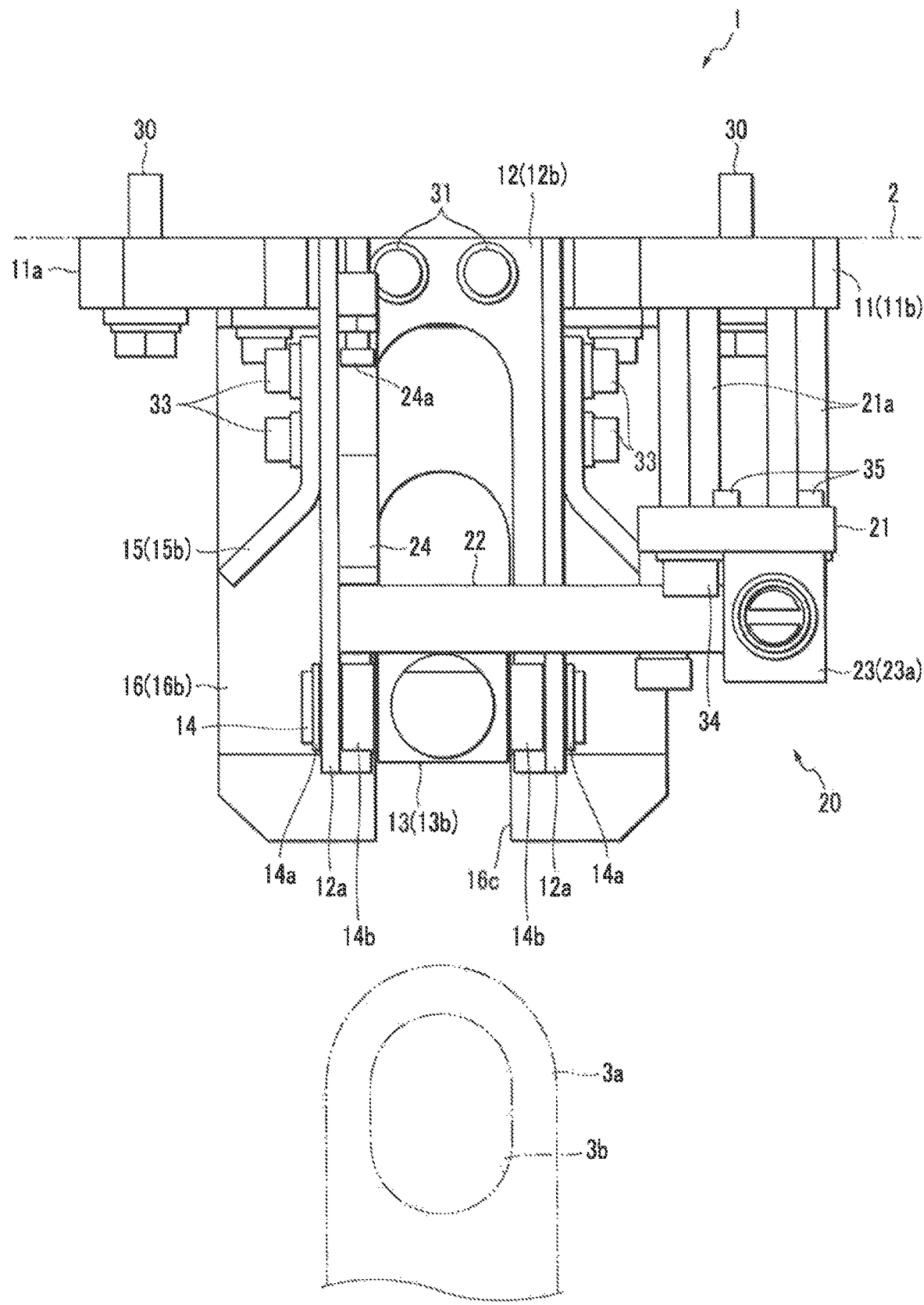
FIG. 5 is a diagram illustrating a plan view of the connecting device.
Figure 8:
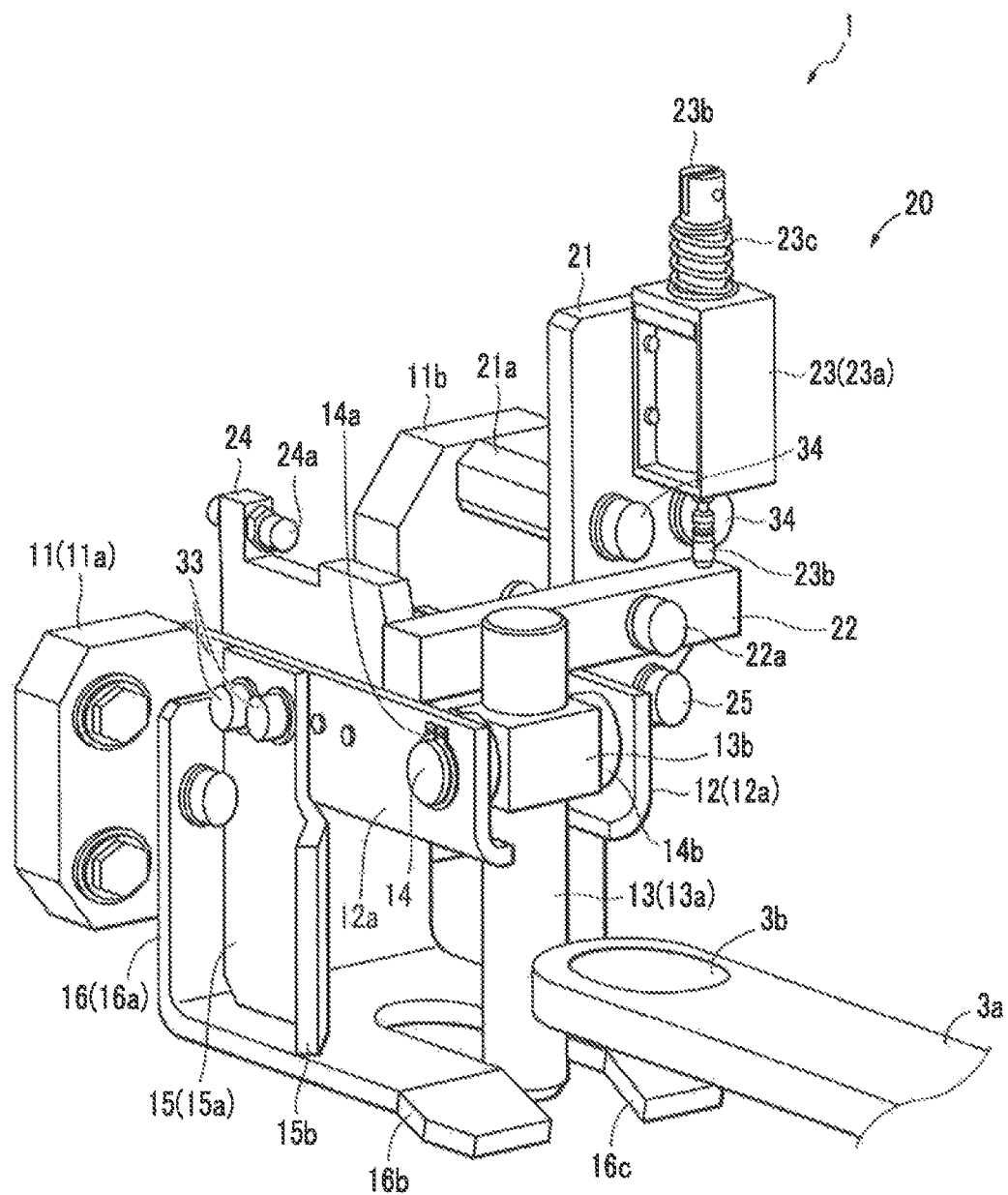
FIG. 8 is a perspective view illustrating the features of the connecting device and the connecting plate.

Also, a connecting plate 3a is provided at a front end section of the wheeled platform 3 (see FIGS. 5 and 8). The connecting plate 3a is composed of a metal (e.g., stainless steel) plate whose front edge has a semi-circular shape in its plan view. An elliptical long hole 3b is formed in the connecting plate 3a at a location away from the front edge by a predetermined distance and, as will be described later, the towing vehicle 2 and the wheeled platform 3 are connected to each other by a connecting pin 13 of the connecting device 1 being brought into fitting engagement with the long hole 3b of the connecting plate 3a. The towing vehicle 2 automatically runs while towing the wheeled platform 3 connected thereto in this manner.

It should be noted that the towing vehicle 2 of this embodiment corresponds to the "one connectable element," the wheeled platform 3 corresponds to the "other connectable element," the connecting pin 13 corresponds to the "connecting member," and the connecting plate 3a corresponds to the "mating member" as recited in the claims.

Figure 2:
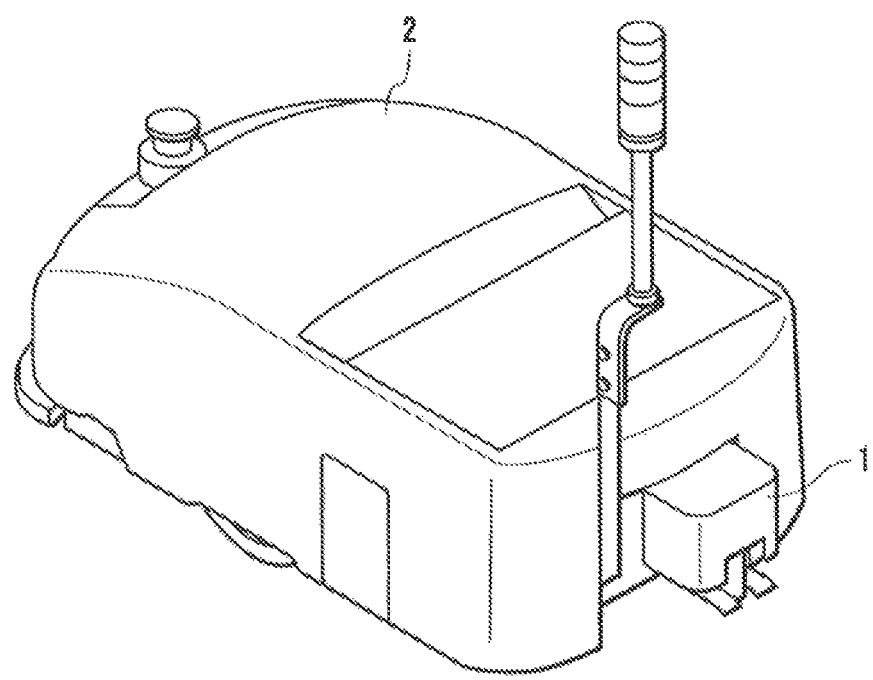
FIG. 2 is a perspective view illustrating the features of the connecting device and the towing vehicle.
Figure 3:
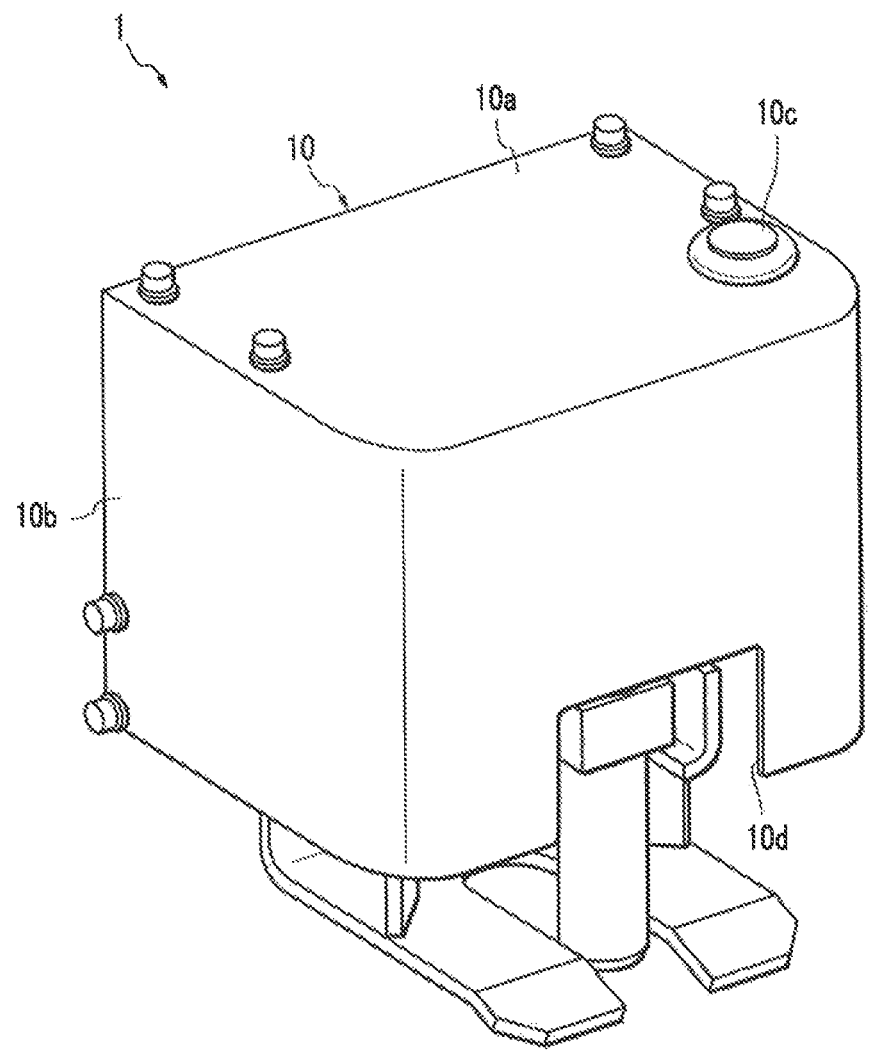
FIG. 3 is a perspective view illustrating the features of the connecting device.

The connecting device 1 includes, as illustrated in FIGS. 1 and 2, a cover 10 provided at the rear end section of the towing vehicle 2 for protecting the section(s) associated with the operation of the connecting device 1. The cover 10 is made of synthetic resin with a substantially rectangular shape whose bottom portion is open as illustrated in FIG. 3. The cover 10 includes a top plate section 10a and a side wall section 10b.

A pressing section 10c is provided at a predetermined location on the top plate section 10a. The pressing section 10c is mechanically connected to the upper end portion of a driving shaft 23b of an actuator 23 which will be described later (see FIG. 4). As will be described later, when a solenoid of the actuator 23 is placed in an unexcited state, the driving shaft 23b can be pressed downward by pressing the pressing section 10c using a finger and the locking arm 22 can be rotated and moved until reaching the unlocking position illustrated in FIG. 7.

Also, a rectangular notch 10d is formed in the lower end section of the rear wall of the side wall section 10b. By virtue of this notch 10d, as will be described later, the side wall section 10b can be prevented from interfering with the connecting pin 13 when the connecting pin 13 is rotated and moved.

Next, the configuration of the connecting device 1 will be described with reference to FIGS. 4 to 6. It should be noted that FIGS. 4 to 6 for ease of understanding illustrates the configuration of the connecting device 1 in a state where the cover 10 is removed. This also applies to FIGS. 7 to 12 which will be described later.

Figure 4:
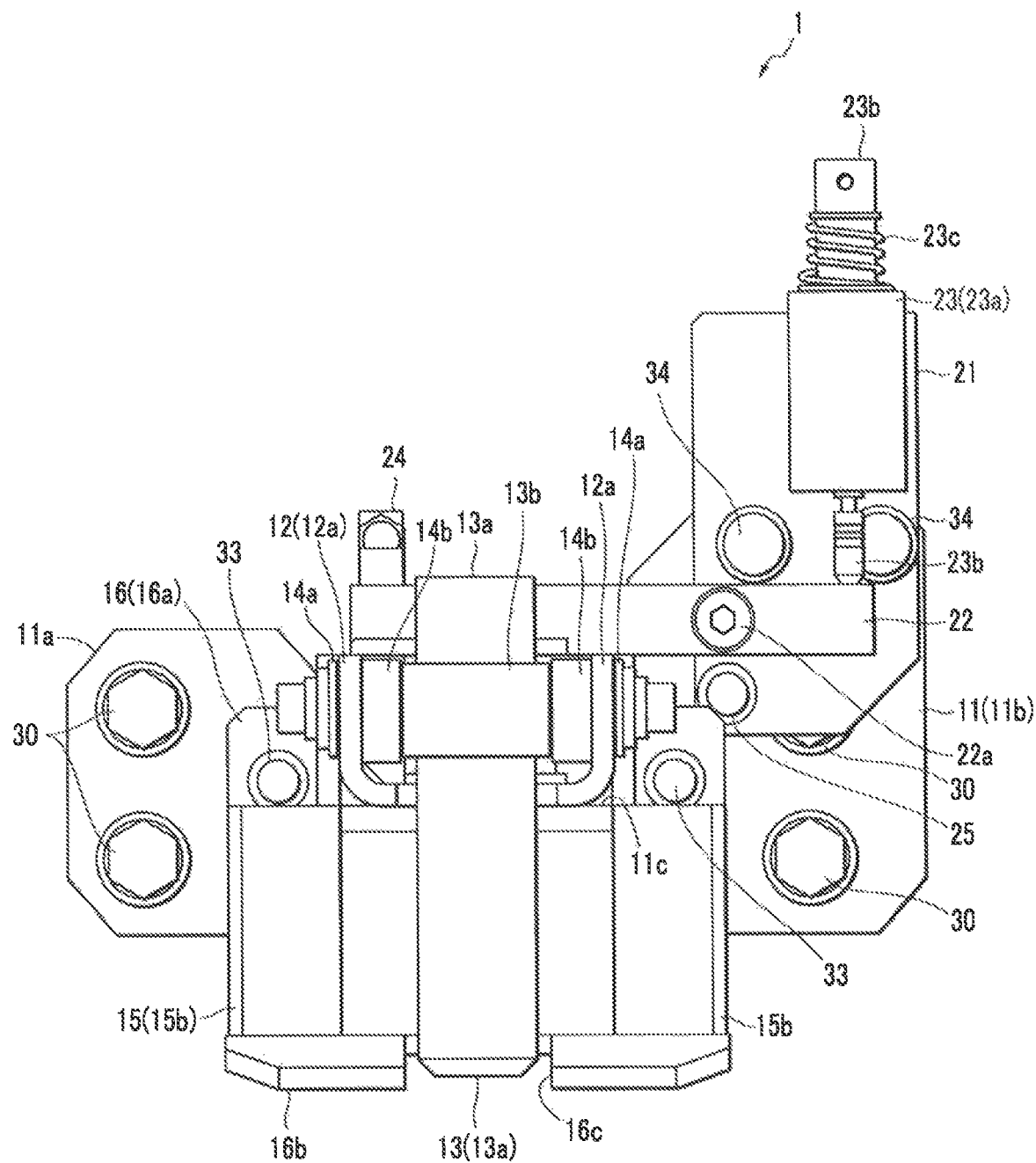
FIG. 4 is a diagram illustrating the connecting device viewed from the rear side of the towing vehicle.
Figure 6:
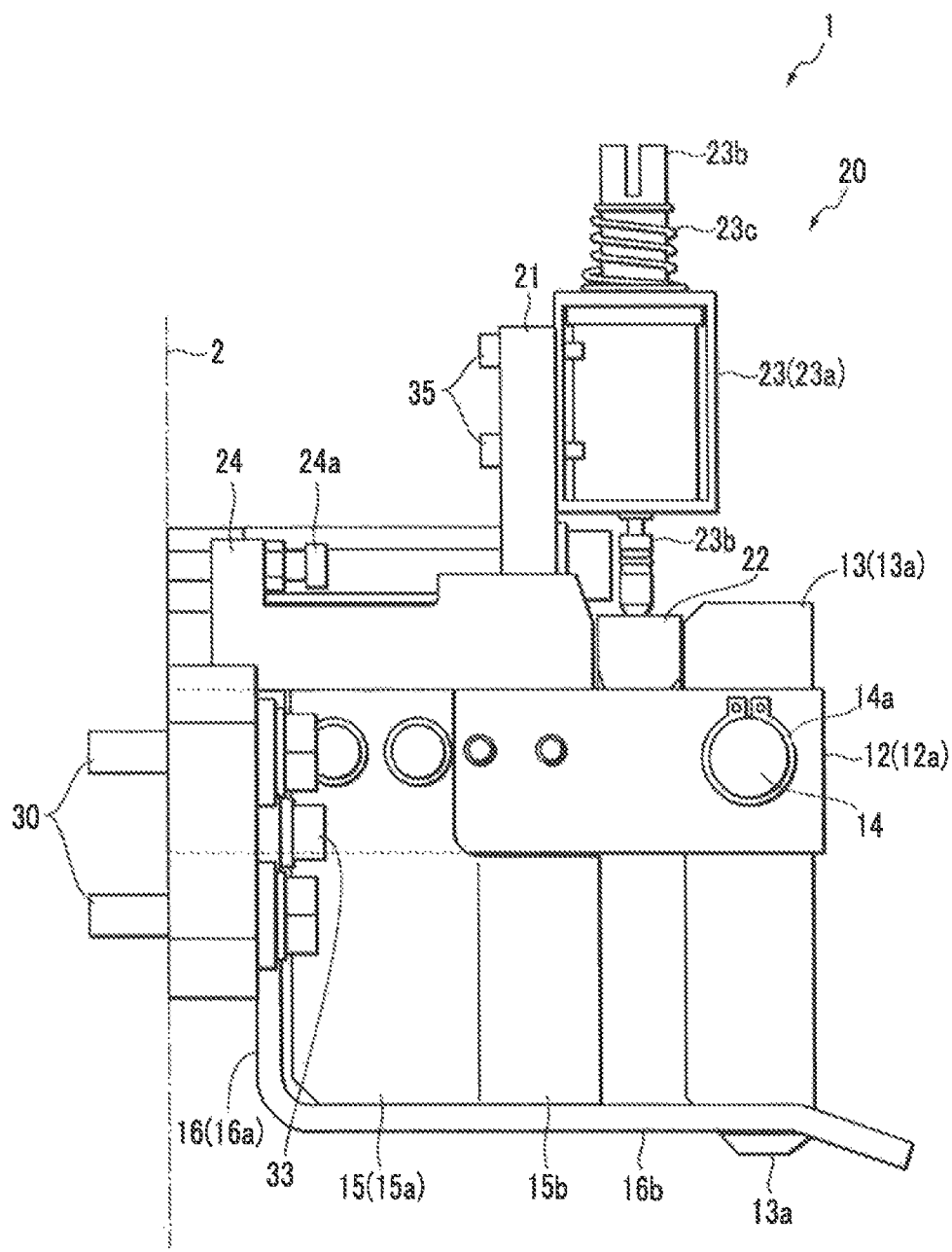
FIG. 6 is a left side view of the connecting device.

Referring to FIGS. 4 to 6, the connecting device 1 includes a base 11, a support member 12, the connecting pin 13, a rotating shaft 14, a pair of (left and right) guide plates 15, 15, a lower guide plate 16, a locking mechanism 20, etc.

The base 11 is a plate-like member made of metal (e.g., stainless steel) and includes, in one piece therewith, left and right wall sections 11a, 11b, and a central wall section 11c extending between them. The left and right wall sections 11a, 11b are attached to the vehicle body of the towing vehicle 2 by means of four bolts 30, by virtue of which, when the towing vehicle 2 resides on a level floor surface, the base 11 is fixed to the towing vehicle 2 in such a manner that extends substantially along a vertical plane.

Also, support member 12 is a plate-like member made of metal (e.g., stainless steel) and includes a pair of arm sections 12a, 12a and a mounting section 12b extending between the lower end sections on the front-side of these arm sections 12a, 12a. The mounting section 12b has a plate-like planar shape. The mounting section 12b is fixed to the upper end surface of the central wall section 11c of the base 11 by means of two bolts 31, 31. The bolt 31 is composed of, for example, a hexagon socket head cap screw, and this also applies to the bolts 32 to 35 which will be described later.

Further, the pair of arm sections 12a, 12a are arranged in plane symmetry with each other and each of the arm sections 12a, 12a is formed in a J-shaped cross section and includes, in one piece therewith, a wall section extending in a front-rear direction along a vertical plane and a lower end section extending in a curved manner inwardly from the lower end of this wall section. The rear end section of the wall section of the arm sections 12a, 12a has a through-hole (not shown) extending therethrough in the left-right direction. The above-described rotating shaft 14 is brought into fitting engagement with the through-hole.

Meanwhile, the above-described connecting pin 13 is a member made of metal (e.g., stainless steel) and includes a connecting section 13a and a bearing section 13b in one piece therewith. The connecting section 13a is formed in a cylindrical shape, and the front side of the lower end section and the front side of the upper end section are obliquely cut out (see FIG. 6).

As will be described later, at the time of disconnection, the connecting pin 13 can be smoothly removed from the connecting plate 3a by means of the notch of the lower end section of the connecting section 13a. Also, by means of the notch at the upper end section of the connecting section 13a, the connecting pin 13 can be rotated and moved smoothly until reaching the position where it is taken out of the fitting engagement with the connecting plate 3a (see FIG. 12) without interference with the stopper 24 which will be described later. Further, the notch at the upper end section of the connecting section 13a has also the function of a guide that guides the track of the locking arm 22 such that the locking arm 22 reliably reaches the locking position when the locking arm 22 which will be described later is rotated and moved from the unlocking position to the locking position.

Further, the diameter of the connecting section 13a is smaller than the dimensions in the front-rear direction and in the left-right direction of the long hole 3b of the above-described connecting plate 3a, by virtue of which, in a state where the connecting pin 13 and the connecting plate 3a are connected to each other, the connecting section 13a of the connecting pin 13 is brought into fitting engagement with the long hole 3b of the connecting plate 3a in a loosely fitted state. Also, the bearing section 13b is rectangular and provided at a predetermined location on the upper side of the connecting section 13a in one piece therewith. The bearing section 13b has a bearing hole (not shown) formed inside of it. The bearing hole extends through the bearing section 13b in the left-right direction.

Meanwhile, the rotating shaft 14 has a shape of a round bar made of metal (e.g., stainless steel). Both end sections (left and right end sections) thereof extend through the bearing hole of the bearing section 13b and the above-described through-hole of the arm sections 12a, 12a toward the outside of the arm sections 12a, 12a, and are attached to the arm sections 12a, 12a in a state retained by the snap rings 14a, 14a.

Also, spacers 14b, 14b are provided between the bearing section 13b and the arm sections 12a, 12a. These spacers 14b, 14b are formed in a hollow annular shape, and the rotating shaft 14 extends through the inner holes of the spacers 14b, 14b in the left-right direction. By virtue of the above-described features, the connecting pin 13 is rotatable about the axis line of the central axis (first axis) of the rotating shaft 14 between the connectable position illustrated in FIG. 10 and the origin position illustrated in FIG. 6, and the disconnection position illustrated in FIG. 12, and is retained such that the track thereof while the rotation is made to extend along the vertical plane by the spacers 14b, 14b.

Also, when the towing vehicle 2 resides on a level floor surface, the connecting pin 13 is placed in such a manner that extends along the vertical axis line by its own weight, and is positioned at the origin position illustrated in FIG. 6. The origin position is identical with the connection position of FIG. 11 which will be described later. It should be noted that the horizontal plane on which the central axis line of the rotating shaft 14 of this embodiment resides corresponds to the "first plane" and the straight line orthogonal to the first plane and extending in the direction in which the connecting member extends corresponds to the "first straight line."

Meanwhile, the above-described left and right guide plates 15, 15 are configured to guide the connecting plate 3a such that the connecting plate 3a and the connecting pin 13 are reliably brought into fitting engagement with each other at the time of the connection operation. The left and right guide plates 15, 15 are arranged in plane symmetry with each other. Each of the guide plates 15, 15 is composed of a metal (e.g., stainless steel) plate and includes a side wall section 15*a* and an oblique wall section 15*b*.

The side wall section 15*a* extends in the front-rear direction along the vertical plane with its upper end section fixed to the arm section 12*a* by means of two bolts 32, 32. The gaps between the side wall sections 15*a*, 15*a* of the left and right guide plates 15, 15 are wider by a predetermined value than the width of the connecting plate 3*a* (see FIG. 5).

Also, the oblique wall section 15*b* is formed such that its height at the upper end section is lower than the side wall section 15*a* and the oblique wall section 15*b* extends obliquely outward from the rear end section of the side wall section 15*a*. By virtue of this, the gap between the oblique wall sections 15*b*, 15*b* of the left and right guide plates 15, 15 increases rearward. In other words, the gap between the oblique wall sections 15*b*, 15*b* decreases frontward.

Figure 10:
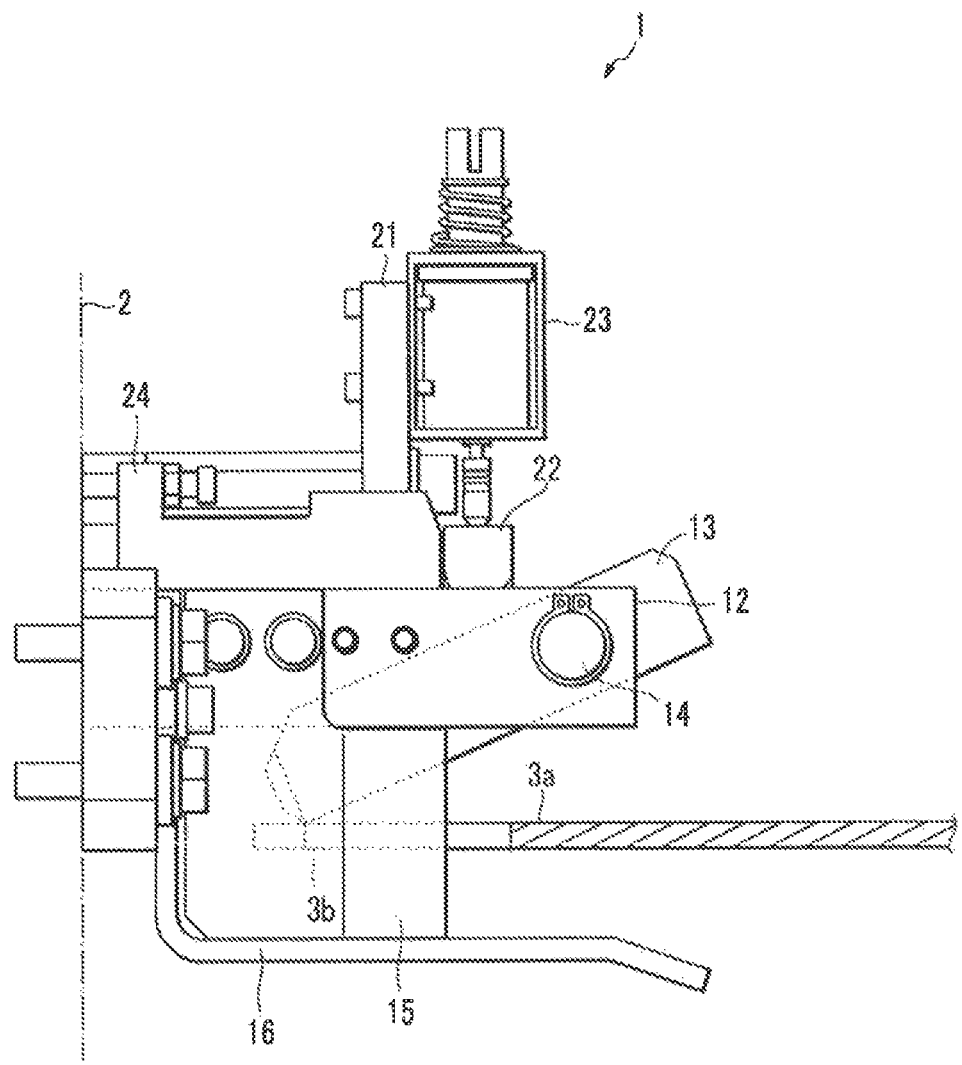
FIG. 10 is a diagram illustrating a state immediately before the connecting pin is brought into fitting engagement with a long hole of a connecting plate.

By virtue of the above-described features of the guide plates 15, 15, when the connecting plate 3*a* moves relatively toward the connecting pin 13 as a result of the movement of the towing vehicle 2, the connecting plate 3*a* is guided by the left and right guide plates 15, 15 even if they are in a positional relationship where they are displaced in the left-right direction, and thus the connecting plate 3*a* reliably reaches the position where fitting engagement with the connecting pin 13 begins (see FIG. 10). As a result, the connecting pin 13 and the connecting plate 3*a* can be connected to each other.

Meanwhile, the above-described lower guide plate 16, in the same manner as the left and right guide plates 15, 15, is configured to guide the connecting plate 3*a* such that the connecting plate 3*a* and the connecting pin 13 are brought into fitting engagement with each other at the time of the connection operation, and is made of a metal (e.g., stainless steel) plate. The lower guide plate 16 includes a front wall section 16*a* and a lower guide wall section 16*b* in one piece with each other, and the front wall section 16*a* extends in an upward-downward direction and is fixed to the base 11 via by means of two bolts 33, 33.

Also, the lower guide wall section 16*b* horizontally extends rearward from the lower end of the front wall section 16*a* with its end portion formed obliquely downward. By virtue of this configuration, for example, at the time of the connection operation, even when the connecting plate 3*a* is oriented obliquely downward, the connecting plate 3*a* can be reliably guided so as to be brought into fitting engagement with the connecting pin 13.

Further, the central section of the lower guide wall section 16*b* has a notch 16*c* formed frontward from the rear end. The width of the notch 16*c* from its left side to the right side is defined to be larger than the diameter of the connecting section 13*a* of the connecting pin 13. The connecting pin 13 is configured to pass the space defined by this notch 16*c* at the time of the rotation of the connecting pin 13, which makes it possible to prevent the lower guide wall section 16*b* from interfering with the connecting pin 13.

Next, the above-described locking mechanism 20 will be described. The locking mechanism 20 is configured, as will be described later, to hold the connecting pin 13 in the state illustrated in FIG. 11 while the connecting pin 13 and the connecting plate 3*a* are in fitting engagement with each other.

The locking mechanism 20 is composed of a mounting plate 21, a locking arm 22, an actuator 23, a stopper 24, etc. The mounting plate 21 is made of a metal (e.g., stainless steel) plate, and is arranged to be in parallel with the base 11 and fixed to the base 11 by means of two bolts 34, 34 and two support posts 21*a*, 21*a*.

Also, the locking arm 22 is a member in the shape of a quadrangular prism, made of metal (e.g., stainless steel), and attached to the mounting plate 21 via a rotating shaft member 22*a*. The rotating shaft member 22*a* is composed of a combination of a hexagon socket head cap screw and a hollow cylindrical spacer. The locking arm 22 has a through-hole (not shown) formed at its predetermined location to extend therethrough in the front-rear direction. The rotating shaft member 22*a* is brought into fitting engagement with the through-hole.

By virtue of the above-described features, the locking arm 22 is rotatable about an axis line of a central axis (second axis) of the rotating shaft member 22*a*, and its track at the time of the rotation will be in such a manner that extends along the vertical plane on which the rotation axis line of the connecting pin 13 resides. The locking arm 22 is driven by the actuator 23 as will be described later and thereby rotated and moved between the locking position illustrated in FIG. 4 and the unlocking position illustrated in FIG. 7.

In accordance with this locking mechanism 20, when the locking arm 22 is at the locking position, the locking arm 22 is placed by its own weight in a state where its lower surface is in abutment on an upper end surface of the arm section 12*a* of the support member 12, and is held in the locking position by the arm section 12*a*. Further, when the locking arm 22 is at the locking position, the front surface of the locking arm 22 will be placed in such a manner that is in abutment on the stopper 24, so that, when the connecting pin 13 is at the origin position illustrated in FIG. 6, the upper end section of the connecting pin 13 is brought into abutment on a rear surface of the locking arm 22, by virtue of which the connecting pin 13 is held in such a manner that cannot be rotated and moved in a counterclockwise direction of FIG. 6. Also, as illustrated in FIG. 7, when the locking arm 22 is rotated and moved in the clockwise direction in the same figure from the locking position to the unlocking position, then the lower surface of the locking arm 22 is brought into abutment on the stopper shaft 25 and thus further rotation and movement will be prevented.

Meanwhile, the actuator 23 is of an electromagnetic type having a solenoid (not shown) as a driving source, and includes a body section 23*a*, a driving shaft 23*b*, and a coil spring 23*c*. The body section 23*a* is fixed to the mounting plate 21 by means of four bolts 35.

Figure 7:
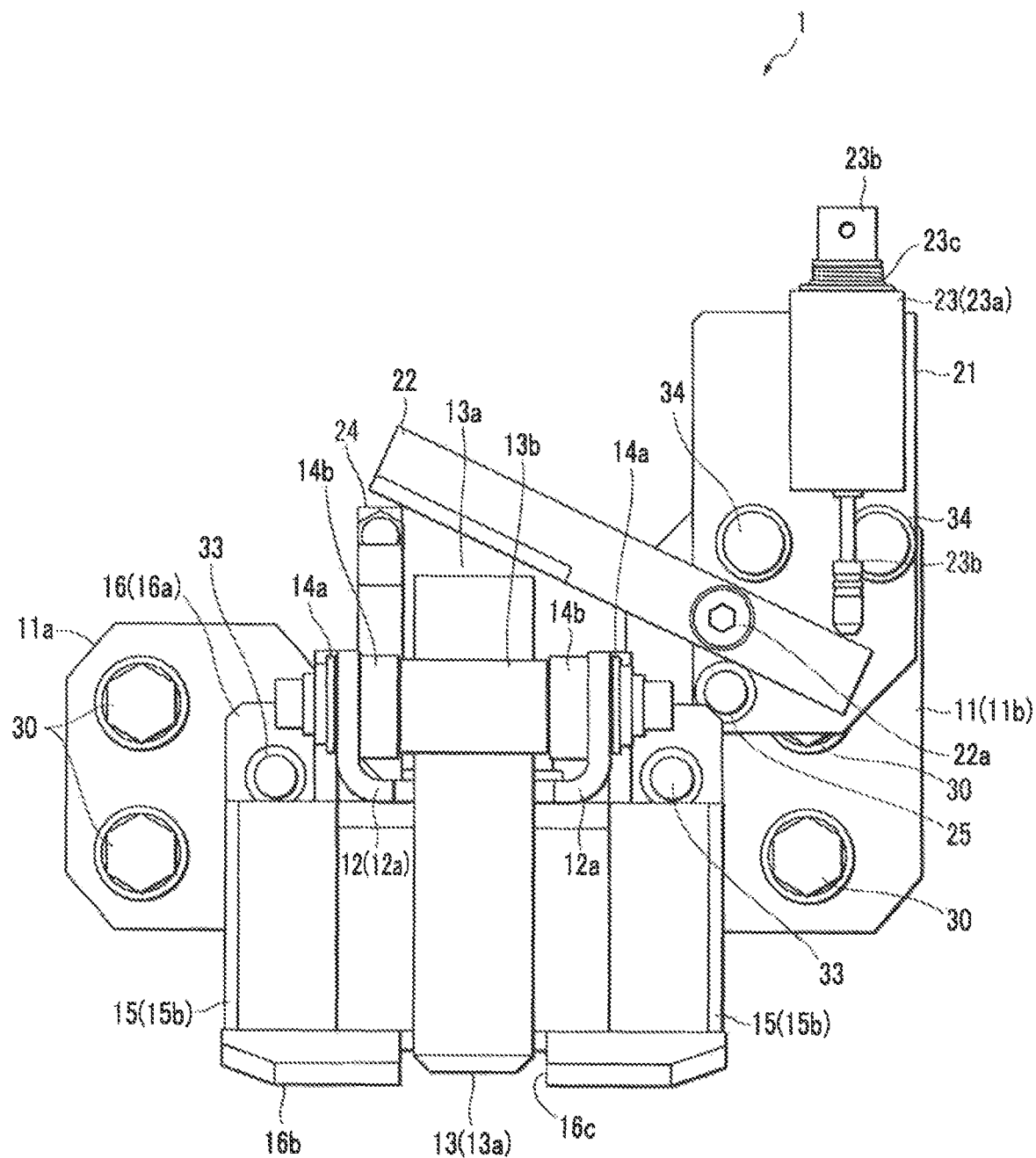
FIG. 7 is a diagram illustrating an unlocking operation of the locking mechanism.

Also, the driving shaft 23*b* is slidable in the upward-downward direction between the origin position illustrated in FIG. 4 and the driving position illustrated in FIG. 7. When the solenoid is in the unexcited state, the driving shaft 23*b* is brought into abutment on the upper surface of the locking arm 22 by the biasing force of the coil spring 23*c* and thus held at the origin position. In this state, the driving shaft 23*b* is held at the locking position by its own weight. Meanwhile, when the solenoid is excited, the driving shaft 23*b* protrudes from the origin position to the driving position against the biasing force of the coil spring 23*c* and causes the locking arm 22 to rotate from the locking position to the unlocking position.

The actuator 23 is electrically connected to the in-vehicle controller. The excited state and the unexcited state of the solenoid is switched in response to supply and stoppage of supply of a driving signal from the in-vehicle controller. It should be noted that, in the following explanations, placing the solenoid in the excited state or unexcited state is referred to as "turning on or off the actuator 23." Also, the connecting device 1 includes two sensors (not-shown). One of these sensors is configured to detect whether or not the locking arm 22 is at the locking position and the other is configured to detect whether or not it is at the unlocking position.

It should be noted that the locking arm 22 of this embodiment corresponds to the "locking member," the actuator 23 to the "driving element" and the "driving device," the vertical plane on which the rotation axis line of the connecting pin 13 resides corresponds to the "second plane," and the vertical plane orthogonal to the former vertical plane corresponds to the "third plane," respectively. Also, the location where the locking arm 22 is in abutment on the connecting pin 13 of corresponds to the "first portion" and the location where the locking arm 22 is abutment on the driving shaft 23b corresponds to the "second portion."

Meanwhile, the above-described stopper 24 is a plate-like member made of metal (e.g., stainless steel) extending in the front-rear direction and is fixed to the right side surface of the above-described left arm 12a by means of the above-described two bolts 32, 32.

The stopper 24 is configured to bear the load of the connecting pin 13 when the locking arm 22 is placed in the locking position and the load from the connecting pin 13 acts upon the locking arm 22. An adjustment screw 24a is provided at the upper end section on the front side of the stopper 24. The distance between the stopper 24 and the connecting pin 13 is adjusted by the adjustment screw 24a.

In other words, the gap (looseness) between the locking arm 22 and the stopper 24 when the locking arm 22 is placed in the locking position can be adjusted by the adjustment screw 24a. By virtue of this, the gap can be adjusted to become narrower even when the gap is widened due to aging. As a result, the impact at the time when the towing of the wheeled platform 3 by the towing vehicle 2 is started can be reduced.

Next, the connection operation by the connecting device 1 having the above-described configuration for connecting the towing vehicle 2 and the wheeled platform 3 to each other and the disconnection operation for disconnecting them from each other will be described with reference to FIGS. 9 to 12. First, in a state where the towing vehicle 2 and the wheeled platform 3 are not connected to each other, when the command signal instructing their connection is input from the main controller to the in-vehicle controller, then the in-vehicle controller determines, on the basis of the detection signal of the sensor, whether or not the locking arm 22 is at the locking position. When the locking arm 22 is at the locking position, the in-vehicle controller causes the towing vehicle 2 to run at a low speed toward the wheeled platform 3.

Figure 9:
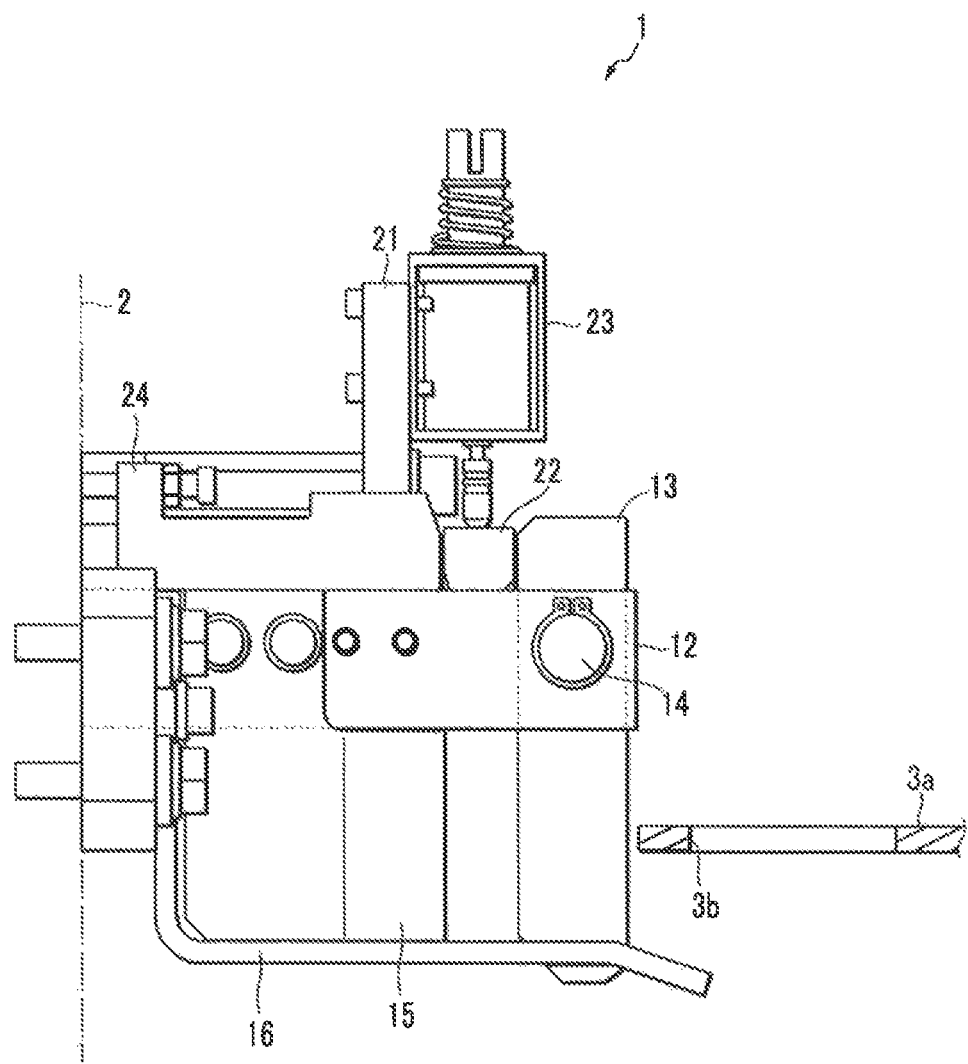
FIG. 9 is a diagram illustrating a state where the connecting plate and the connecting pin begins to enter into abutment on each other.

In response to the low-speed running of the towing vehicle 2 toward the wheeled platform 3, when the connecting pin 13 of the connecting device 1 starts to abut the connecting plate 3a at the location illustrated in FIG. 9, then the connecting pin 13 is pressed by the connecting plate 3a and starts to rotate clockwise in the figure about the axial center of the rotating shaft 14. It should be noted that, in the following explanations, the terms "clockwise" and "counterclockwise" in relation to FIGS. 9 to 12 are simply indicated as "clockwise" and "counterclockwise," respectively.

In addition, when the towing vehicle 2 further moves toward the wheeled platform 3, the connecting plate 3a is guided by the left and right guide plates 15, 15 and the lower guide plate 16 and relatively moves between the left and right guide plates 15, 15, presses the connecting pin 13 to rotate it clockwise. Further, in a state where the connecting pin 13 has been rotated and moved to reach the connectable position illustrated in FIG. 10, when the connecting plate 3a and the connecting pin 13 are placed in a positional relationship in which lower end section of the connecting pin 13 is taken out of contact with the upper surface of the connecting plate 3a and moves into the long hole 3b, then the connecting pin 13 rotates counterclockwise to be brought into fitting engagement with the long hole 3b of the connecting plate 3a. As a result, the connecting pin 13 and the connecting plate 3a are connected to each other, and the towing vehicle 2 and the wheeled platform 3 are placed in an interconnected state.

Figure 11:
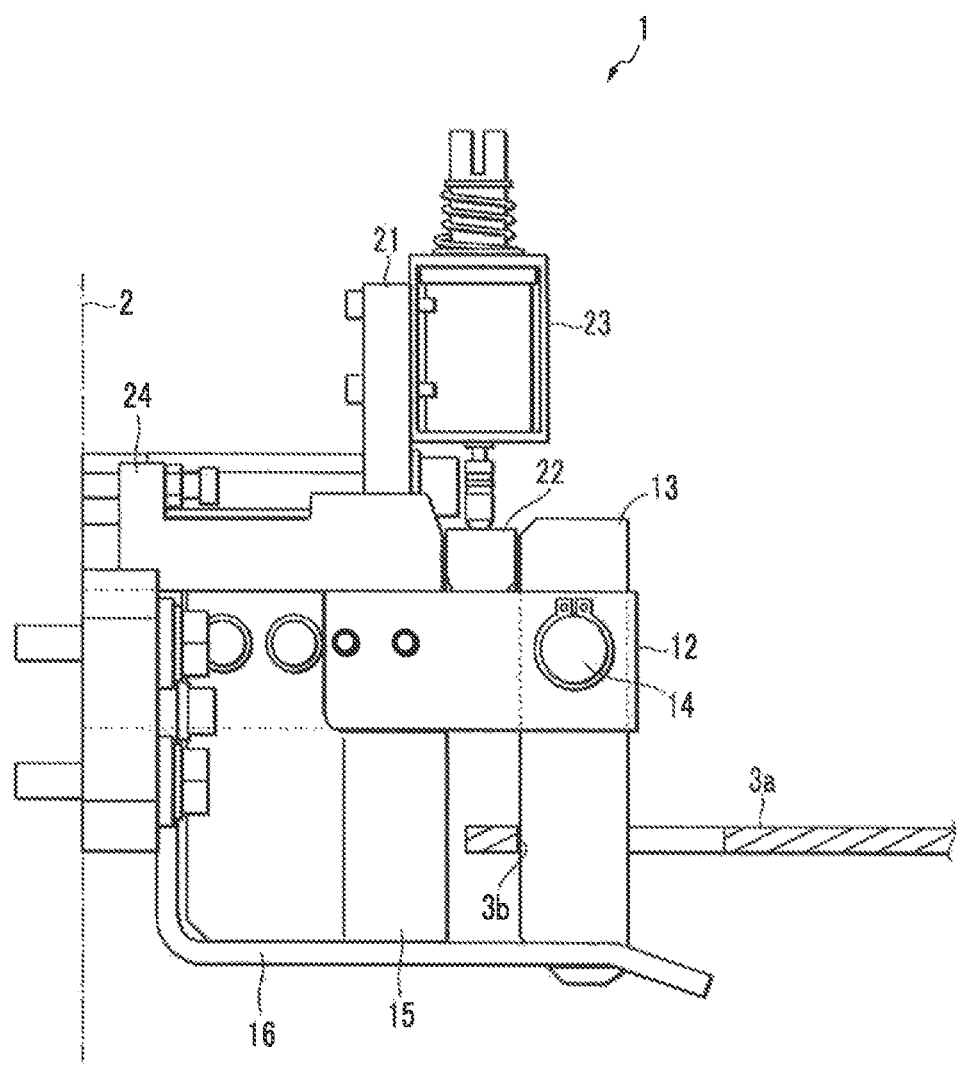
FIG. 11 is a diagram illustrating a state of the connecting device when a towing vehicle is towing a wheeled platform.

In this manner, in a state where the towing vehicle 2 and the wheeled platform 3 are connected to each other, when the towing vehicle 2 starts towing of the wheeled platform 3 in accordance with the command signal from the main controller, then the connecting pin 13 is brought into abutment on the edge section of the long hole 3b of the connecting plate 3a as illustrated in FIG. 11 and the inertia mass on the side of the wheeled platform 3 acts as a load upon the connecting pin 13. As a result, a moment with the axis center of the rotation shaft being the center of rotation is created in the connecting pin 13, in response to which a load (compressive load) acts on the location of abutment of the connecting pin 13 on the locking arm 22.

At this point, the location of abutment of the connecting pin 13 on the locking arm 22 is short in its distance of the working point from the rotation center when compared with the location of abutment of connecting pin 13 on the connecting plate 3a, so that a load larger than the load caused by the inertia mass on the side of the wheeled platform 3 will act on the locking arm 22. In contrast, since the stopper 24 is in abutment on the locking arm 22 from the opposite side of the connecting pin 13, such a larger load can be borne by the stopper 24, making it possible to prevent an excessive load from acting on the locking arm 22. By virtue of this, in comparison with a case where the load from the connecting pin 13 is only borne by the locking arm 22, the strength and durability of the connecting device 1 can be improved.

Figure 12:
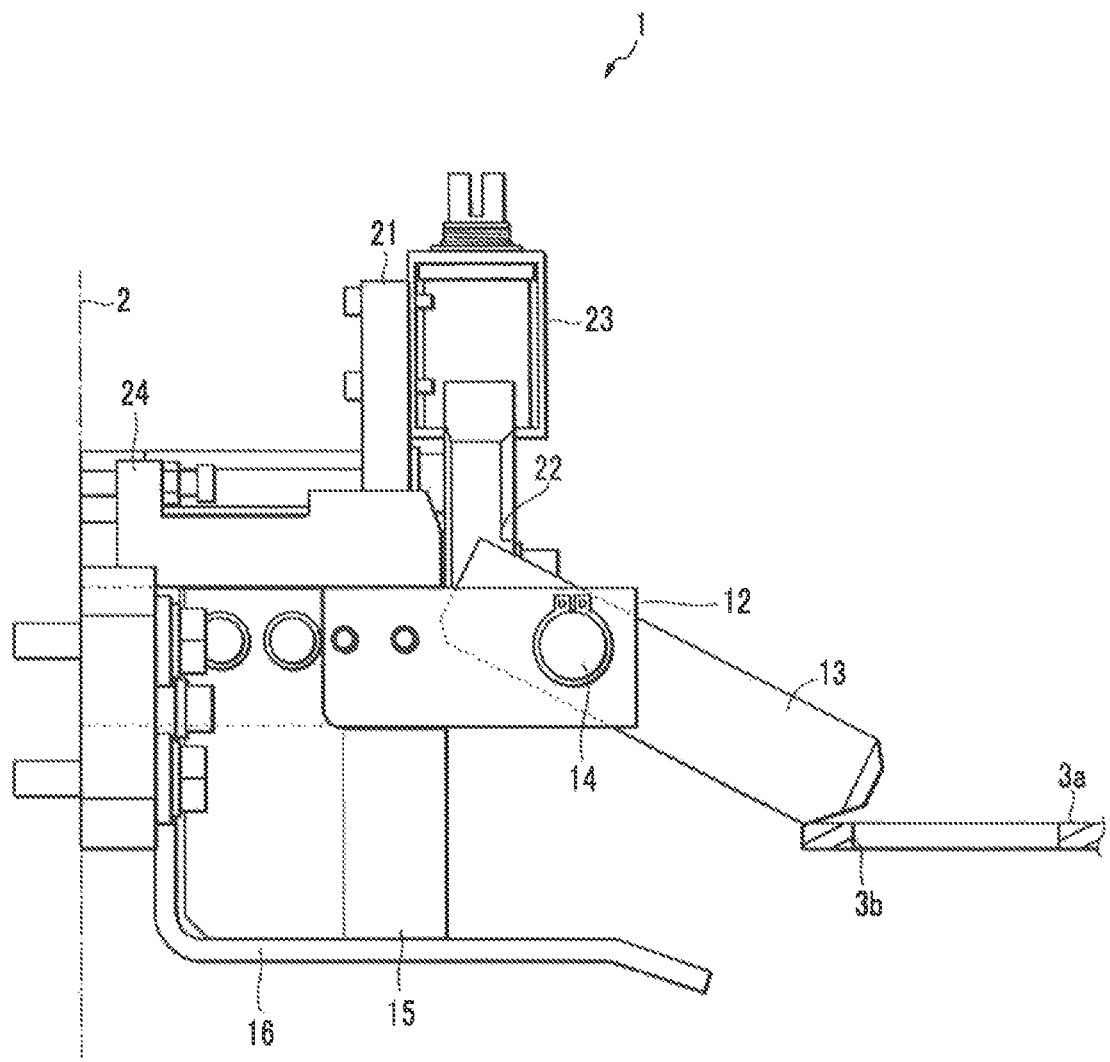
FIG. 12 is a diagram illustrating a state immediately after the connecting pin and the connecting plate are taken out of the fitting engagement.

Also, in a state where the towing vehicle 2 and the wheeled platform 3 are connected to each other, when a command signal causing disconnection is input from the main controller to the in-vehicle controller, the in-vehicle controller turns on the actuator 23 of the locking mechanism 20 to rotate and move the locking arm 22 from the locking position illustrated in FIG. 11 to the unlocking position illustrated in FIG. 12 (or FIG. 7). In addition, when it has been detected that the locking arm 22 rotated and moved and reached the unlocking position on the basis of the detection signal of the sensor, the in-vehicle controller causes the towing vehicle 2 to run at a low speed such that it moves away from the wheeled platform 3.

In response to this, the connecting pin 13 rotates counterclockwise to get out of the long hole 3b of the connecting plate 3a and, in such a manner that is placed in a situation where it has rotated and moved to reach the disconnection position illustrated in FIG. 12, when the lower end section of the connecting pin 13 is detached from the upper surface of the connecting plate 3a, then the connecting pin 13 rotates counterclockwise by its own weight and is restored to the origin position illustrated in FIG. 6.

In this manner, in accordance with the connecting device 1 according to this embodiment, it is made possible to automatically perform the connection operation to connect the towing vehicle 2 and the wheeled platform 3 to each other and the disconnection operation to disconnect them from each other. In addition to this, as will be described later, the connection operation and the disconnection operation can also be manually performed.

First, at the time of the interconnection, either of the wheeled platform 3 and the towing vehicle 2 is moved relatively to approach the other using human power and the like, and at the position illustrated in FIG. 9, the connecting pin 13 and the connecting plate 3a are brought into abutment on each other, and then the connecting pin 13 is rotated and moved until it reaches the connectable position illustrated in FIG. 10. In addition, either of the wheeled platform 3 and the towing vehicle 2 is moved toward the other until the position is reached where the connecting pin 13 is brought into fitting engagement into the long hole 3b of the connecting plate 3a, and thus they can be connected to each other.

Further, at the time of disconnection, the pressing section 10c of the above-described cover 10 is pressed by a finger, and the driving shaft 23b of the actuator 23 is pressed from the origin position illustrated in FIG. 4 to the driving position illustrated in FIG. 7 against the biasing force of the coil spring 23c, and thereby the locking arm 22 is rotated and moved from the locking position illustrated in FIG. 4 to the unlocking position illustrated in FIG. 7. In this state, either of the towing vehicle 2 and the wheeled platform 3 is moved by human power and the like to move away from the other and thereby they can be disconnected from each other.

In this manner, it is made possible to automatically perform the connection operation to interconnect the towing vehicle 2 and the wheeled platform 3 and the disconnection operation, and also manually perform the connection operation and the disconnection operation, which improves usability.

Also, the towing vehicle 2 and the wheeled platform 3 can be readily disconnected from each other merely by virtue of the one round of movement of the towing vehicle 2, by virtue of which usability can be further improved. Also, when the connecting pin 13 is at the connection position illustrated in FIG. 11, the location of abutment (third portion) of the connecting pin 13 where the locking arm 22 is brought into abutment on the connecting pin 13 resides on the opposite side of the horizontal place where the central axis line of the rotating shaft 14 resides with respect to the location of abutment (fourth portion) where the connecting plate 3a is brought into abutment. By virtue of this, when the connecting plate 3a relatively moves form the position illustrated in FIG. 11 to the position illustrated in FIG. 12 for disconnection, the locking arm 22 is prevented from interfering with the relative movement of the connecting plate 3a, which makes it possible to smoothly perform the disconnection operation.

Also, since the connecting pin 13 is configured to be positioned at the connection position illustrated in FIG. 6 by its own weight when it is not in fitting or mating engagement with the connecting plate 3a, the connecting pin 13 rotates to reach the disconnection position illustrated in FIG. 12, disengaged from the connecting plate 3a, and then rotates and moves by its own weight from the disconnection position to be restored to the connection position. As a result, it is not necessary to provide a member for restoring the connecting pin 13 from the disconnection position to the connection position, and the manufacturing costs can be thereby reduced.

In addition to this, the portion (second portion) of the locking arm 22 driven by the actuator 23 resides on the opposite side of the rotation axis line of the locking arm 22 in the longitudinal direction of the locking arm 22 with respect to the location of abutment on the connecting pin 13 (first portion), so that the actuator 23 can be prevented from interfering with the rotational movement of the connecting pin 13.

It should be noted that the embodiment is described based on the example where the towing vehicle 2 and the wheeled platform 3 are used as the two connectable elements but the two connectable elements of the present invention to this, as long as they are configured to be placed in the interconnection and disconnected from each other by the connecting device. For example, as the two connectable elements, a manned towing vehicle and a wheeled platform may be used.

Also, the embodiment is described based on an example where a connection bar having a long hole is used as the mating member but the mating member of the present invention, as long as it can be brought into engagement with the connecting member. For example, as the mating member, a U-shaped or J-shaped hook or chain may be used.

Further, the embodiment is described based on the example where the connecting pin 13 is used as the connecting member but the connecting member of the present invention is not limited to this as long as the connecting member is configured to rotate about a predetermined first axis line between the connection position where the connecting member connects the two connectable elements to each other by being brought into engagement with the mating member of the other of the two connectable elements and the disconnection position where the two connectable elements are disconnected from each other as a result of the connecting member being disconnected from the mating member by the relative movement of the mating member in response to the relative movement between the two connectable elements. For example, a plate-like or prism-like connecting member and connecting member having a bent shape in the front-rear direction may be used.

Meanwhile, the embodiment is described based on the example where the locking arm 22 is used as the locking member but the locking member of the present invention is not limited to this as long as the locking member is movable between the locking position where the locking member is brought into abutment on the connecting member which is at the connection position and the connecting member is locked at the connection position such that the connecting member cannot rotate and move from the connection position toward the disconnection position and the unlocking position where the connecting member is unlocked at the connection position as a result of the abutment on the connecting member being exited. For example, as the locking member, a member that rotates about a vertical axis line between the locking position and the unlocking position and a member that moves between the locking position and the unlocking position through a linear movement may be used.

Also, the embodiment is described based on the example where the actuator 23 is used as the driving element but the driving element of the present invention is not limited to this as long as the driving element is capable of driving the locking member such that the locking member moves between the locking position and the unlocking position. For example, as the driving element, an actuator that includes a motor may be used, in which case electricity corresponds to the energy. Also, a hydraulic actuator may be used as the driving element, in which case the hydraulic pressure corresponds to the energy. Further, as the driving element, the actuator 23 may be omitted and instead a driving member that can drive the locking member by a manual operation only may be used.

Further, the embodiment is described based on the example where the position illustrated in FIG. 11 is defined as the connection position of the connecting member but the connection position of the present invention is not limited to this as long as the connection position is a position at which the two connectable elements can be connected to each other by bringing the connecting member into engagement with the mating member. For example, a position somewhere on the route of rotation and movement on which the connecting pin 13 as the connecting member rotates and moves from the position illustrated in FIG. 10 to the position illustrated in FIG. 11 where it is in fitting engagement with the long hole 3b of the connecting plate 3a may be defined as the connection position, in which case, at the connection position, the locking member at the locking position should be configured to be in abutment on the connecting member.

Meanwhile, the connecting device 1 according to a possible mode of the embodiment does not need to include the left and right guide plates 15, 15 or the lower guide plate 16.

Also, the connecting device 1 according to the embodiment may be arranged in a vertically inverted manner, in which case the connecting device 1 should be configured such that the connecting pin 13 is retained at the origin position and the locking arm 22 at the locking position by virtue of a biasing force of a spring or the like.

What is claimed is:

1. A connecting device provided in one of two connectable elements and configured to connect the two connectable elements to each other and disconnect the two connectable elements from each other, the connecting device comprising:
   a connecting member rotatable about a predetermined first axis line between a connection position where the connecting member is brought into engagement with a mating member of another of the two connectable elements so as to connect the two connectable elements to each other and a disconnection position where the connecting member is disengaged from the mating member by movement of the mating member in response to relative movement of the two connectable elements so as to disconnect the two connectable elements from each other;
   a locking member movable between a locking position where the locking member is brought into abutment on the connecting member at the connection position and locks the connecting member at the connection position such that the connecting member is not rotatable out of the connection position toward the disconnection position and an unlocking position where the locking member is taken out of the abutment on the connecting member so as to unlock the connecting member at the connection position; and
   a driving element capable of driving the locking member such that the locking member moves between the locking position and the unlocking position,
   wherein the driving element is composed of a driving device driving the locking member by supply of energy.

2. The connecting device according to claim 1, wherein a location of abutment of the connecting member where the locking member is in abutment on the connecting member in the connection position is arranged on an opposite side of a first plane on which the predetermined first axis line resides with respect to a location of engagement of the connecting member where the mating member is in engagement with the connecting member.

3. The connecting device according to claim 2, wherein the first plane is configured to be orthogonal to a first straight line extending in a direction in which the connecting member extends.

4. The connecting device according to claim 1, wherein the connecting member is configured to be positioned at the connection position by its own weight when it is not in engagement with the mating member.

5. The connecting device according to claim 1, further comprising a fixed abutment member configured to be brought into abutment on the locking member from an opposite side of the connecting member when the connecting member is at the connection position and the locking member is at the locking position.

6. A towing vehicle comprising the connecting device according to claim 1, wherein the towing vehicle is the one connectable element.

7. A connecting device provided in one of two connectable elements and configured to connect the two connectable elements to each other and disconnect the two connectable elements from each other, the connecting device comprising:
   a connecting member rotatable about a predetermined first axis line between a connection position where the connecting member is brought into engagement with a mating member of another of the two connectable elements so as to connect the two connectable elements to each other and a disconnection position where the connecting member is disengaged from the mating member by movement of the mating member in response to relative movement of the two connectable elements so as to disconnect the two connectable elements from each other;
   a locking member movable between a locking position where the locking member is brought into abutment on the connecting member at the connection position and locks the connecting member at the connection position such that the connecting member is not rotatable out of the connection position toward the disconnection position and an unlocking position where the locking member is taken out of the abutment on the connecting member so as to unlock the connecting member at the connection position; and
   a driving element capable of driving the locking member such that the locking member moves between the locking position and the unlocking position,
   wherein
   the locking member is configured to move between the locking position and the unlocking position by rotating about a predetermined second axis line along a second plane that is parallel to a second straight line extending in a direction in which the connecting member in the connection position extends and parallel to the predetermined first axis line, and
   the driving element is capable of driving a second portion of the locking member on an opposite side of a third plane parallel to the second straight line where the predetermined second axis line resides with respect to a first portion of the locking member in abutment on the connecting member when the locking member is at the locking position.

8. The connecting device according to claim 7, wherein a location of abutment of the connecting member where the locking member is in abutment on the connecting member in the connection position is arranged on an opposite side of a first plane on which the predetermined first axis line resides with respect to a location of engagement of the connecting member where the mating member is in engagement with the connecting member.

9. The connecting device according to claim 8, wherein the first plane is configured to be orthogonal to a first straight line extending in a direction in which the connecting member extends.

10. The connecting device according to claim 7, wherein the connecting member is configured to be positioned at the connection position by its own weight when it is not in engagement with the mating member.

11. The connecting device according to claim 7, further comprising a fixed abutment member configured to be brought into abutment on the locking member from an opposite side of the connecting member when the connecting member is at the connection position and the locking member is at the locking position.

12. The connecting device according to claim 7, wherein the driving element is composed of a driving device driving the locking member by supply of energy and being capable of driving the locking member by a manual operation when the energy is not supplied.

13. A towing vehicle comprising the connecting device according to claim 7, wherein the towing vehicle is the one connectable element.

14. A connecting device provided in one of two connectable elements and configured to connect the two connectable elements to each other and disconnect the two connectable elements from each other, the connecting device comprising:
  a connecting member rotatable about a predetermined first axis line between a connection position where the connecting member is brought into engagement with a mating member of another of the two connectable elements so as to connect the two connectable elements to each other and a disconnection position where the connecting member is disengaged from the mating member by movement of the mating member in response to relative movement of the two connectable elements so as to disconnect the two connectable elements from each other;
  a locking member movable between a locking position where the locking member is brought into abutment on the connecting member at the connection position and locks the connecting member at the connection position such that the connecting member is not rotatable out of the connection position toward the disconnection position and an unlocking position where the locking member is taken out of the abutment on the connecting member so as to unlock the connecting member at the connection position; and
  a driving element capable of driving the locking member such that the locking member moves between the locking position and the unlocking position,
  wherein the driving element is composed of a driving device driving the locking member by supply of energy and being capable of driving the locking member by a manual operation when the energy is not supplied.

15. The connecting device according to claim 14, wherein a location of abutment of the connecting member where the locking member is in abutment on the connecting member in the connection position is arranged on an opposite side of a first plane on which the predetermined first axis line resides with respect to a location of engagement of the connecting member where the mating member is in engagement with the connecting member.

16. The connecting device according to claim 15, wherein the first plane is configured to be orthogonal to a first straight line extending in a direction in which the connecting member extends.

17. The connecting device according to claim 14, wherein the connecting member is configured to be positioned at the connection position by its own weight when it is not in engagement with the mating member.

18. The connecting device according to claim 14, further comprising a fixed abutment member configured to be brought into abutment on the locking member from an opposite side of the connecting member when the connecting member is at the connection position and the locking member is at the locking position.

19. A towing vehicle comprising the connecting device according to claim 14, wherein the towing vehicle is the one connectable element.

* * * * *